United States Patent [19]

Ellsworth et al.

[11] Patent Number: 5,744,183
[45] Date of Patent: Apr. 28, 1998

[54] REMOVAL OF SULFIDES FROM ALCOHOLIC BEVERAGES

[76] Inventors: Robert M. Ellsworth, 1770 Dean York La., St. Helena, Calif. 94574; Gordon Burns, 1324 Los Posadas Rd., Angwin, Calif. 94508

[21] Appl. No.: 516,073

[22] Filed: Aug. 17, 1995

[51] Int. Cl.$^6$ .............. C12C 11/11; C12G 1/00; C12H 1/00
[52] U.S. Cl. .............. 426/330.4; 426/422; 426/487; 426/592
[58] Field of Search ............... 426/330.4, 592, 426/422, 487

[56] References Cited

U.S. PATENT DOCUMENTS

| | | | |
|---|---|---|---|
| 4,758,351 | 7/1988 | Kern | 210/688 |
| 5,505,973 | 4/1996 | Fussnegger et al. | 426/422 |

FOREIGN PATENT DOCUMENTS

| | | |
|---|---|---|
| 2 243 720 | 4/1975 | France . |
| 2 244 816 | 4/1975 | France . |
| 413541 | 8/1934 | United Kingdom . |
| 428853 | 6/1935 | United Kingdom . |
| 964280 | 7/1964 | United Kingdom . |

OTHER PUBLICATIONS

Amerine et al, Methods for Analysis of Musts and Wines, John Wiley & Sons, New York, 1980, pp. 246,261,265 & 156.

*Primary Examiner*—David L. Lacey
*Assistant Examiner*—Curtis E. Sherrer
*Attorney, Agent, or Firm*—Townsend and Townsend and Crew LLP

[57] ABSTRACT

Wines and other alcoholic beverages are treated to remove sulfides by passing the beverage through a filter medium comprising polyvinyl polypyrrolidone, polyvinylimidazole, or a copolymer of the monomers of these two polymers, the polymer or copolymer having been pretreated with a solution of a metallic salt, preferably copper sulfate or silver nitrate.

12 Claims, No Drawings

REMOVAL OF SULFIDES FROM ALCOHOLIC BEVERAGES

This invention lies in the field of alcoholic beverage processing, and the removal of sulfides.

BACKGROUND OF THE INVENTION

The processing of alcoholic beverages, particularly wines, includes a treatment to remove soluble sulfides which affect the odor of the beverage, often in an undesirable way. Included among these sulfides are hydrogen sulfide, dimethyl sulfide, ethyl methyl sulfide, methanethiol (methyl mercaptan), ethanethiol (ethyl mercaptan) and diethyl disulfide, plus numerous others. Current methods for removal of sulfides include the addition of a metallic salt, copper sulfate being a prominent example, followed by removal of the salt after allowing a suitable period for equilibrium to be reached.

The amount of copper sulfate typically added is approximately 100 times the stoichiometric amount, thus entailing a considerable consumption of copper sulfate. In addition, the total copper content (both native and added) must be lowered to less than 0.5 ppm, and preferably less than 0.2 ppm, once the treatment is completed. Potassium ferrocyanide has been used to precipitate both copper and iron, the precipitate then being removed by filtration. The so-called "popcorn" polymers, polyvinyl polypyrrolidone and polyvinyl imidazole, and in particular polyvinyl imidazole, have been used successfully to remove copper and iron from beverages. Nevertheless, multiple process steps and large amounts of copper sulfate have been required.

SUMMARY OF THE INVENTION

It has now been discovered that sulfides can be removed from wine and other alcoholic beverages in a highly efficient manner without the introduction of any metal salts into the beverage. This is achieved by the use of "popcorn" polymers which have been pretreated by adsorption of the metal salt, instead of adding the salt directly to the beverage. Adsorption is readily achieved by contacting the polymer medium with an aqueous solution of the selected metal salt, as for example by passing a sufficient quantity of the salt solution through the medium to retain a substantial amount of the metal salt on the medium. The beverage can be passed through the treated polymer which is either in the form of a bed (thus using packed bed filtration, in which the packed bed consists of granular filters or ion exchange columns) or a filter sheet or membrane, or the polymer can be added to the beverage in the form of particles prior to filtration. This will produce a filtrate substantially free of sulfides. The treated medium can be used repeatedly before regeneration is needed, each time removing the sulfides from the beverage, or at least lowering the sulfide content well below the levels considered objectionable either for reasons of odor or taste or for other regulatory purposes.

Further features and advantages of the invention and its various embodiments will become apparent from the description which follows.

DETAILED DESCRIPTION OF THE INVENTION AND PREFERRED EMBODIMENTS

Metallic salts suitable for use in the present invention include salts of any metallic cations which can be adsorbed or otherwise retained by the polymers. Examples of such cations are copper, silver, iron, nickel, zinc, aluminum and tin. Preferred among these are copper and silver, with copper the most preferred. The anions may vary as well. Sulfate and nitrate are preferred anions, with sulfate the most preferred.

The polymers in this invention are known materials and serve as supports for the adsorbed metal ion. Polyvinyl polypyrrolidone (PVPP) is a polymer known for use in beverage processing for the removal of polyphenols, and is commercially available from such suppliers as BASF, Ludwigshafen/Rhein, Germany, and Schenk Filterbau GmbH, Waldstetten, Germany. Polyvinylimidazole (PVI) is similarly known for the removal of metals and is likewise commercially available. These polymers can be prepared or manufactured by conventional techniques known in the polymer industry. Copolymers of N-vinylpyrrolidone and N-vinylimidazole are readily obtained in the same manner as PVPP manufacture by combining the two monomers in the desired proportions in aqueous solution, with N,N'-divinylimidazolidone as a crosslinking agent. A typical ratio of N-vinylimidazole to N-vinylpyrrolidone is 9:1, although this can vary considerably.

The polymer may be used in the form of a fixed bed of powder, granules, or beads, or in the form of a porous sheet. Sheets are preferred for ease of handling and efficiency. The porosity and thickness of the sheet can vary, and is not critical to the invention. As expected for porous sheet filters in general, greater porosity will permit a faster throughput rate of the beverage through the sheet but will have a lower capacity for retention of the metallic ion and for removal of the sulfides from the beverage. The optimal selection of parameters such as porosity, thickness and pore size range of the sheet for any given operation will be based upon throughput rate, volume, expected sulfide level, and economic considerations in general, and will be readily determinable by routine laboratory determinations if not already known to the operator. The polymer may be blended with or otherwise supported by a further matrix which provides a strong coherent sheet. One example of such as matrix is cellulose.

Treatment of the polymeric support with the metallic salt can be achieved in any conventional manner. The preferred method is to saturate the medium with a liquid solution of the salt. This can be accomplished by simply passing a volume of the solution through the medium. Preferred solutions are aqueous solutions, since the beverage itself will be an aqueous solution.

The amount of metallic salt applied to the support can vary and is not critical. In certain cases, however, it will be preferable to limit the amount of metal ion so that the beverage itself does not leach the ion from the support during the sulfide removal filtration. The appropriate limit will vary with the physical form of the support, as well as with the particular metal ion used. For copper sulfate being applied as an aqueous solution to a support in the form of a thin sheet, preferred amounts of copper ion retained by the sheet are within the range of about 0.003 to about 3.0 mg, most preferably 0.01 mg to about 0.10 mg, of copper ion per square centimeter of external sheet surface. Note that the term "external surface" is used herein to denote the exposed area of one side of the sheet, not including any internal pore surface area. Expressed in terms of milligrams of copper ion per grams of polymer in the media, whether the media be in sheet form or particulate form, the ranges are about 0.03 to about 30 mg of copper ion per gram of polymer, preferably from about 0.1 about 10.0 mg per gram, and most preferably from about 1 to about 3 mg per gram.

The amount of metal ion in the solution can vary as well. For aqueous copper sulfate solutions, a typical range in terms of copper sulfate is about 5 mg/L to about 100 mg/L, with about 1 mg/L to about 50 mg/L preferred.

Alcoholic beverages which can be treated by the process of tiffs invention include any such beverage which contains sulfide compounds whose removal is desired. Such beverages include those made by fermentation as well as those made by distillation. Examples are wine (red, white, and sparkling), beer, and whiskeys. Wine and beer are of particular interest, with wine perhaps the greatest interest.

For media in the form of filter sheets or fabrics, particles (whether powders or granules) embedded in filter sheets or fabrics, or particles retained in flow-through housings, the beverage to be treated is simply allowed to flow through the media, using pressure if necessary. For media in the form of loose particles, the media is simply added to the beverage in batch form, allowed to adsorb the sulfides, with agitation if desired to enhance contact, and then removed from the beverage by simple inert filtration. Other methods of achieving contact between the media and the beverage and then recovering the beverage will be readily apparent to those skilled in the art.

Filter media prepared in accordance with this invention can be used for large volumes of the alcoholic beverage. For wines containing sulfides in typical amounts, a sheet of the filter media can be used to process in excess of 100 mL of wine per square centimeter of external sheet surface area, and in some cases in excess of 250 mL per square centimeter, before regeneration of the sheet is necessary. Regeneration can be achieved at any time with, for example, the use of a hot 1% solution of NaOH. The polymer particles or sheets can then be recharged with a fresh solution of the metal salt.

The following examples are offered by way of illustration, and are not intended to limit the invention.

EXAMPLE 1

This example illustrates the repeated use of a copper sulfate-treated PVI sheet in removing sulfides from wine.

A PVI sheet obtained from Schenk Filterbau GmbH (Waldstetten, Germany) was cut to fit a circular filter housing with an exposed diameter of 1.5 inches (3.8 cm), thereby providing a filter area of 11.4 cm$^2$. The sheet consisted of PVI and PVPP powder at a weight ratio of 90:10 supported on cellulose in a sheet 3 mm in thickness, the PVI/PVPP powder amounting to 40% by weight of the sheet. The weight of PVI/PVPP polymer in the filter area of the sheet was therefore 0.26 gram. The sheet was further characterized by its supplier as having a permeability of 760 liters per hour per 1600 cm$^2$.

The sheet was mounted in the housing, and a 100-mL solution of copper sulfate in water, containing 5 mg/L of copper ion, was passed through the sheet by imposing a pressure differential across the sheet of about 5 psi (3.4×10$^4$ pascals) with nitrogen gas, requiring approximately 2 minutes. The quantity of copper ion thus used was therefore 0.044 mg per square centimeter of external filter sheet surface.

Ethyl mercaptan was added to 4 liters of a white wine to a concentration of 18.5 ng/L, and the wine was passed through the filter sheet in 250-mL aliquots in the same manner as the copper sulfate solution, each aliquot requiring about 6 minutes to pass through the filter. At the completion of each aliquot, the filtrate was sampled and analyzed for ethyl mercaptan by gas chromatography/mass spectroscopy using a flame photometry detector, and for copper ion by atomic adsorption. The results are shown in Table I.

TABLE I

Repeated Filtration Test No. 1

| 250-mL Aliquot No. | Cu in Filtrate (mg/L) | $C_2H_5SH$ in Filtrate (ng/L) |
| --- | --- | --- |
| 0 (starting wine) | 0.05 | 18.5 |
|  | 0.03 | <0.5 |
| 2 | 0.03 | <0.5 |
| 4 | 0.03 | <0.5 |
| 6 | 0.02 | <0.5 |
| 8 | 0.03 | <0.5 |
| 10 | 0.03 | <0.5 |
| 12 | 0.04 | <0.5 |
| 14 | 0.03 | 0.8 |
| 16 | 0.03 | 0.9 |

This data indicates that the treated filter remained effective in lowering the sulfide content below the detection limit through 3 liters of wine.

EXAMPLE 2

This example is a repeat of the experiment of Example 1, except that the PVI sheet was treated with a 10 mg/L copper sulfate solution rather than 5 mg/L, the amount of ethyl mercaptan added to the wine was 8.8 ng/L, and the flow rate of the wine aliquots through the treated PVI sheet was 3 minutes per 250 mL aliquot, twice the flow rate in Example 1. Ten liters of wine (40 aliquots) were used rather than four. The results are shown in Table II.

TABLE II

Repeated Filtration Test No. 2

| 250-mL Aliquot No. | Cu in Filtrate (mg/L) | $C_2H_5SH$ in Filtrate (ng/L) |
| --- | --- | --- |
| 0 (starting wine) | 0.07 | 8.8 |
| 1 | 0.17 | <0.5 |
| 2 | 0.12 |  |
| 3 | 0.12 | <0.5 |
| 4 | 0.11 | <0.5 |
| 8 | 0.08 | <0.5 |
| 12 | 0.06 | <0.5 |
| 16 | 0.07 | <0.5 |
| 20 | 0.07 | <0.5 |
| 24 | 0.06 | <0.5 |
| 28 | 0.05 | 0.8 |
| 32 | 0.06 | 1.3 |
| 36 | 0.06 | 0.9 |
| 40 | 0.06 | 2.5 |

This data indicates that the higher loading of copper ion on the filter sheet resulted in a slight amount of the copper appearing in the filtrate wine of the first liter of aliquots. The average over ten liters was not significant. Sulfides in the filtrate remained below the detection limit through the first six liters of the wine.

EXAMPLE 3

The purpose of this example is to determine whether copper ion initially absorbed by a PVI membrane is released into the filtrate when the membrane is used to remove sulfides from wine.

Five Schenk PVI sheets identical to those used in Examples 1 and 2 were cut and mounted in a filter housing identical in size to that used in Examples 1 and 2. A 100-mL copper sulfate solution was passed through each of the five sheets, with the copper sulfate concentration differing for each sheet, the concentrations ranging from 1.0 mg/L to 50 mg/L. The copper sulfate solution in each case was followed with 100 mL of white wine (without added sulfide). In each case the 100-mL aliquots (both copper sulfate solution and wine) were given a single pass and required about 2 minutes to pass entirely through the sheet.

Copper ion analyses of the treatment solutions and the wine were performed both before and after filtration through the sheets, and the results are shown in Table III.

TABLE III

Copper Retention Test Results

| Test No. | Liquid Sampled | Copper Content Before Passage Through Sheet (mg/L) | Copper Content After Passage Through Sheet (mg/L) | Copper Retained by Sheet* (mg/cm$^2$) |
|---|---|---|---|---|
| 1 | CuSO$_4$ solution | 1.00 | 0.00 | 0.009 |
|   | wine | 0.09 | 0.03 | |
| 2 | CuSO$_4$ solution | 2.50 | 0.00 | 0.022 |
|   | wine | 0.09 | 0.05 | |
| 3 | CuSO$_4$ solution | 5.00 | 0.00 | 0.044 |
|   | wine | 0.09 | 0.10 | |
| 4 | CuSO$_4$ solution | 10.00 | 0.14 | 0.086 |
|   | wine | 0.09 | 0.33 | |
| 5 | CuSO$_4$ solution | 50.00 | 2.55 | 0.416 |
|   | wine | 0.09 | 2.90 | |

*Difference between copper content of CuSO$_4$ solution before and after passage through sheet, divided by membrane area.

This data shows that for this PVI sheet, the optimal copper loading was 0.044 mg of copper ion per square centimeter of sheet surface, since above that level the copper appeared in increased concentrations in the wine.

EXAMPLE 4

This example illustrates the use of both copper and silver as absorbed ions on a PVI membrane for removing sulfides from wine. The copper was applied as copper sulfate and the silver as silver nitrate.

Two PVI sheets identical to those of Examples 1, 2 and 3 were treated respectively with 100 mL of a copper sulfate solution at 2.5 mg/L of copper ion, and 100 mL of a silver nitrate solution at 2.5 mg/L of silver nitrate, using the treatment procedure described in Example 1. The wine tested on each sheet was a problem white wine to which nothing had been added. The wine was passed through each sheet in 250-mL aliquots as in the previous examples, and levels of both ethyl mercaptan and methyl mercaptan were measured in the filtrate by gas chromatography/mass spectrometry. The results are shown in Table IV.

TABLE IV

Copper/Silver Comparison

| | Copper-Treated Membrane | | Silver-Treated Membrane | |
|---|---|---|---|---|
| 250-mL Aliquot No. | $C_2H_5SH$ in Filtrate (ng/L) | $CH_3SH$ in Filtrate (ng/L) | $C_2H_5SH$ in Filtrate (ng/L) | $CH_3SH$ in Filtrate (ng/L) |
| 0 (starting wine) | 0.9 | 2.8 | 0.9 | 2.8 |
| 1 | <0.5 | 0.9 | <0.5 | <0.5 |
| 4 | <0.5 | 1.1 | <0.5 | <0.5 |
| 7 | <0.5 | 1.3 | <0.5 | 0.8 |
| 10 | <0.5 | 1.8 | <0.5 | 0.9 |
| 13 | <0.5 | 2.1 | <0.5 | 1.1 |
| 16 | <0.5 | 2.2 | <0.5 | 1.3 |
| 19 | <0.5 | 2.1 | <0.5 | 1.5 |
| 21 | <0.5 | 2.2 | <0.5 | 1.4 |

The data indicate that silver ion is at least as effective as copper ion in the removal of sulfides from wine, and that both ethyl mercaptan and methyl mercaptan are removed by this process.

The foregoing is offered primarily for purposes of illustration. It will be readily apparent to those skilled in the art that the operating conditions, materials, procedural steps and other parameters of the system described herein may be further modified or substituted in various ways without departing from the spirit and scope of the invention.

We claim:

1. A method for the treatment of an alcoholic beverage to remove dissolved sulfides, comprising:

(a) treating a polymer in solid form selected from the group consisting of polyvinylimidazole and copolymers of N-vinylpyrrolidone and N-vinylimidazole with an aqueous solution of a metallic salt selected from the group consisting of salts of copper, silver, iron, nickel, zinc, aluminum and tin;

(b) after said polymer has been so treated, separately contacting said alcoholic beverage with said polymer to adsorb sulfides on said polymer from said alcoholic beverage; and (c) separating said alcoholic beverage from said polymer.

2. A method in accordance with claim 1 in which said metallic salt is a member selected from the group consisting of salts of copper and silver.

3. A method in accordance with claim 1 in which said metallic salt is a copper salt.

4. A method in accordance with claim 1 in which said metallic salt is a member selected from the group consisting of salts of metallic nitrates and sulfates.

5. A method in accordance with claim 1 in which said metallic salt is a member selected from the group consisting of copper sulfate and silver nitrate.

6. A method in accordance with claim 1 in which said aqueous solution contains a member selected from the group consisting of copper sulfate and silver nitrate at a concentration of from about 0.5 mg/L to about 100 mg/L.

7. A method in accordance with claim 1 in which said aqueous solution contains a member selected from the group consisting of copper sulfate and silver nitrate at a concentration of from about 1 mg/L to about 50 mg/L.

8. A method in accordance with claim 1 in which said polymer is in the form of a membrane.

9. A method in accordance with claim 8 in which step (a) comprises passing through said membrane a solution of copper sulfate in an amount of solution containing from about 0.03 to about 30.0 mg of copper ion per square centimeter of external membrane surface.

10. A method in accordance with claim 8 in which step (a) comprises contacting said membrane with a solution of copper sulfate in an amount of solution containing from about 0.1 to about 10.0 mg of copper ion per square centimeter of external membrane surface.

11. A method in accordance with claim 8 in which step (a) comprises passing through said membrane a solution of silver nitrate in an amount of solution containing from about 0.03 to about 30.0 mg of silver ion per square centimeter of external membrane surface.

12. A method in accordance with claim 8 in which step (a) comprises contacting said membrane with a solution of silver nitrate in an amount of solution containing from about 0.1 to about 10.0 mg of silver ion per square centimeter of external membrane surface.

* * * * *